July 2, 1946.
C. H. WIDMAN ET AL
2,403,159
METHOD OF MAKING CATERPILLAR LINKS
Filed Oct. 19, 1942
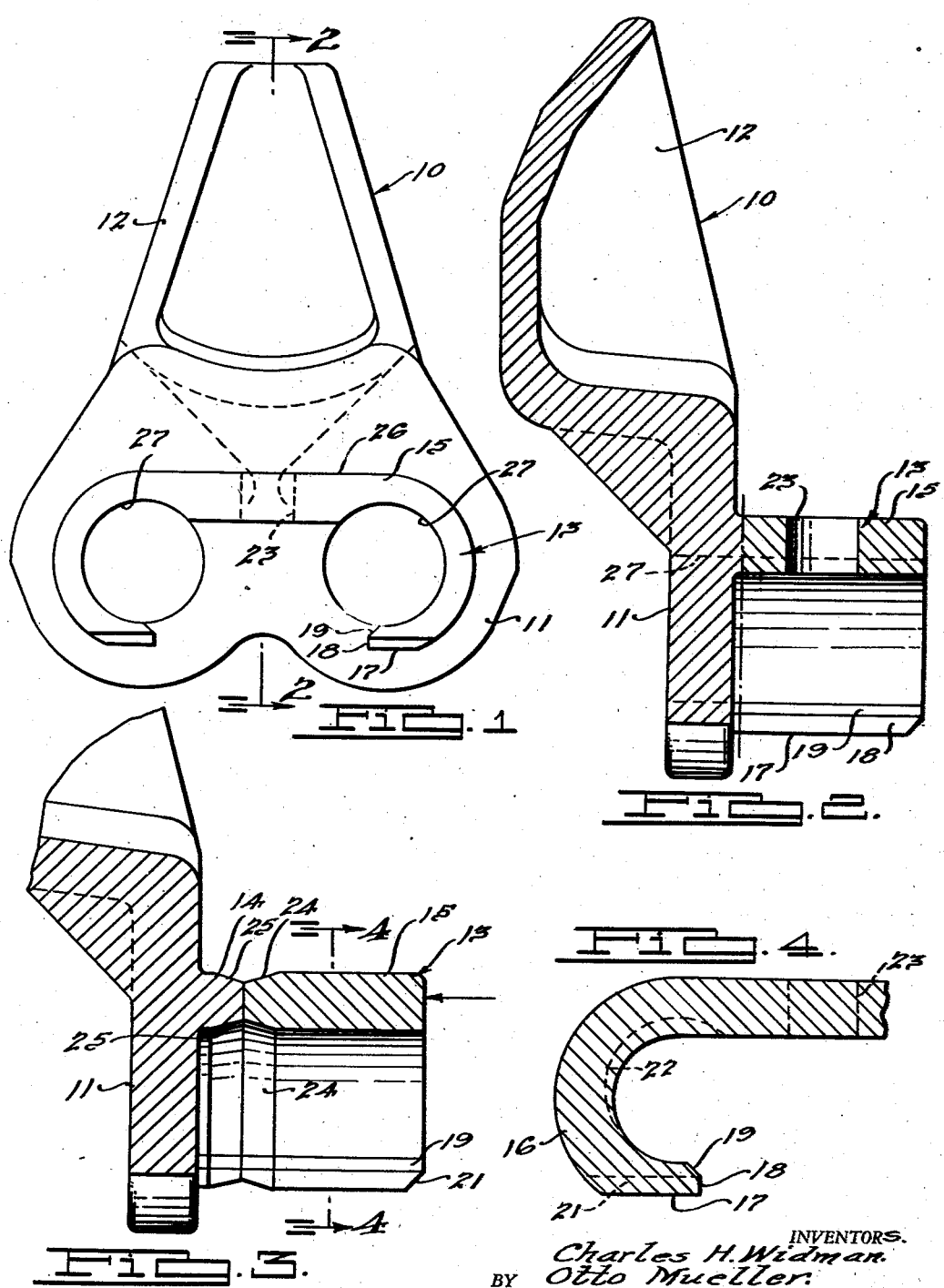
INVENTORS.
Charles H. Widman.
BY Otto Mueller.
Harness, Dickey & Pierce
ATTORNEYS.

Patented July 2, 1946

2,403,159

UNITED STATES PATENT OFFICE 2,403,159

METHOD OF MAKING CATERPILLAR LINKS

Charles H. Widman, Detroit, and Otto Mueller, Dearborn, Mich.

Application October 19, 1942, Serial No. 462,534

4 Claims. (Cl. 29—148.3)

This invention relates to a method of making links for a caterpillar type of track, and particularly to a link for a caterpillar track, a portion of which is a forging having a formed metal strip welded thereto to project from one side thereof.

Heretofore, it has been the practice to manufacture a link similar to that of the present invention, from a forging having a cup-shaped end portion projecting from one side and a heavy, solid projection of metal on the opposite side. The heavy solid projection of metal was machined in a costly and lengthy operation to desired form.

The present invention has for its object, the manufacture of the links for a caterpillar track which eliminates substantially all of the difficult machining heretofore found necessary in the production of the link.

Another object of the invention is the construction of the link from a forging or hot formed sheet to which a formed strip of metal is secured by welding.

A still further object of the invention pertains to the manufacture of the links of the caterpillar track by forging or hot forming a portion thereof which is substantially uniform in thickness and providing an embossed flange thereon to which a formed piece of metal is secured by a flash welding operation.

A still further object of the invention is to form a link in a caterpillar track from formed pieces of metal which are welded together to thereby eliminate all of the machining except the boring and drilling operation on the holes extending therethrough.

Other objects and features of novelty of the invention will be either specifically pointed out or will become apparent when referring, for a better understanding of the invention, to the following description taken in conjunction with the accompanying drawing, wherein:

Figure 1 is a view in elevation of a link of a caterpillar track, embodying features of this invention;

Fig. 2 is an enlarged sectional view of the structure illustrated in Fig. 1, taken on the line 2—2 thereof;

Fig. 3 is a broken sectional view of structure, similar to that of Fig. 2, before the drilling and boring operations; and Fig. 4 is a broken sectional view of the formed metal strip before the welding and machining operations, taken along the line 4—4 thereof.

The link 10 for the caterpillar track is illustrated in Figures 1 and 2 as comprising a body portion 11, a cup-shaped end portion 12 extending from one side of the body portion, and a hub portion 13 projecting from the opposite side thereof. When the entire link was manufactured hertofore from a forging, difficulty was experienced during the forging operation to obtain enough metal on the one side of the body portion from which to machine the hub 13. A lengthy, tedious, and costly machining operation was required on the forged metal to produce the hub 13 as illustrated in Figs. 1 and 2.

In practicing the present invention, a forging or hot formed part is made comprising the body portion 11, the cup-shaped end portion 12, and a projecting flange 14 of the same contour as the hub 13. The hub 13 is formed from a strip of metal 15 which is bent around a mandrel to form the hook-like ends 16, one of which is clearly illustrated in Fig. 4. The end portions 17 and 18, as well as the angular side portions 19 and 21, are preferably coined or otherwise formed prior to the forming operation so as to be of finished shape when assembled. The only metal which must be removed from the formed strip is that indicated by the dotted line at 22 and that of the hole which is to be drilled at 23.

Slightly tapered surfaces 24 are coined or otherwise formed on the inner edge of the strip, as illustrated in Fig. 3, and similar surfaces 25 are provided on the flange 14. The reduction in width of the abutted faces of the flange and strip concentrates the flow of current during the flash welding operation. These faces may be cleaned before the welding operation, by a pickling, grinding, or similar treatment. The outer face of the strip 15 forming the hub portion 13 is moved in toward the body portion 11 an amount substantially equal to the thickness of the strip so as to be positioned a required amount from the outer face of the body portion 11 after the welding operation. Thereafter the flash from the weld may be ground or otherwise removed from the outer surface 26 as well as from the inner surface of the hub and the holes 27 may then be bored, broached, drilled, reamed, or otherwise machined in the body portion 11 and in the wall of the strip 15. The hole 23 through the hub portion, as illustrated in Figs. 1 and 2, is also preferably drilled after the forming and welding operations. It is to be understood that the holes 27 may be punched in the forging or hot formed part during the forming operation.

It will thus be seen that the lengthy and costly machining operation required to shape the hub 13 from a solid block of metal projecting from the body portion 11 has been eliminated. Only a very simple drilling, broaching, boring, or similar operation is required to produce the shape desired to the hub 13, which, in accordance with the practice of the present invention, is formed from a strip of metal and welded to a flange of the link. When employing the flash welding method of securing the formed strip 15 of the forging, assurance is had that a perfect weld is formed, producing a hub 13 which is as strong, if not stronger than the forged hub heretofore utilized.

What is claimed is:

1. The method of forming a link for a caterpillar track which includes the steps; of hot forming a piece of metal into the shape of the body portion of the link from which a cup-like end portion extends from one side and a C-shaped flange projects from the other side, of forming a strip of metal to the shape of said flange, and of welding the formed strip thereto.

2. The method of constructing a link for a caterpillar track which includes the steps; of hot forming a portion of the link having a body, a cup-shaped end extending from one side of the body and an elongated substantially oval-shaped flange with spaced ends on the opposite side, of forming a strip of metal into elongated oval-shape with spaced ends following the form of the flange on the forging, and of flash welding the edge of the formed strip to the flange.

3. The method of constructing a link for a caterpillar track which includes the steps; of forming a portion of the link to include a body portion, a cup-shaped end portion extending from one side of the body portion and an elongated, substantially oval-shaped flange with spaced ends on the opposite side of the body portion, of forming a strip of metal into elongated oval-shape with spaced ends following the form of the flange on the forging, of coining the spaced ends of the strip to desired shape, and of welding the strip to the flange.

4. The method of constructing a link for a caterpillar track which includes the steps; of forming a portion of the link to include a body portion, a cup-shaped end portion extending from one side of the body portion, and an elongated substantially oval-shaped flange with spaced ends on the opposite side of the body portion, of forming a strip of metal into elongated oval-shape with spaced ends following the form of the flange on the forging, of coining the spaced ends of the strip to desired shape, of welding the strip to the flange, and of thereafter machining apertures through said body portion while dressing the inner surface of said formed strip.

CHARLES H. WIDMAN.
OTTO MUELLER.